Figure 9:
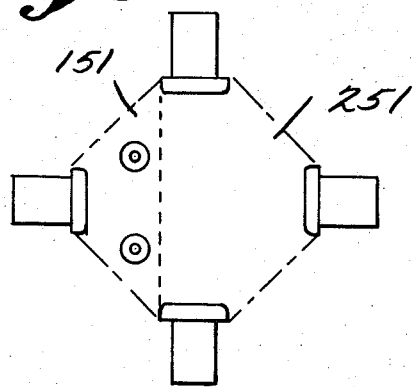

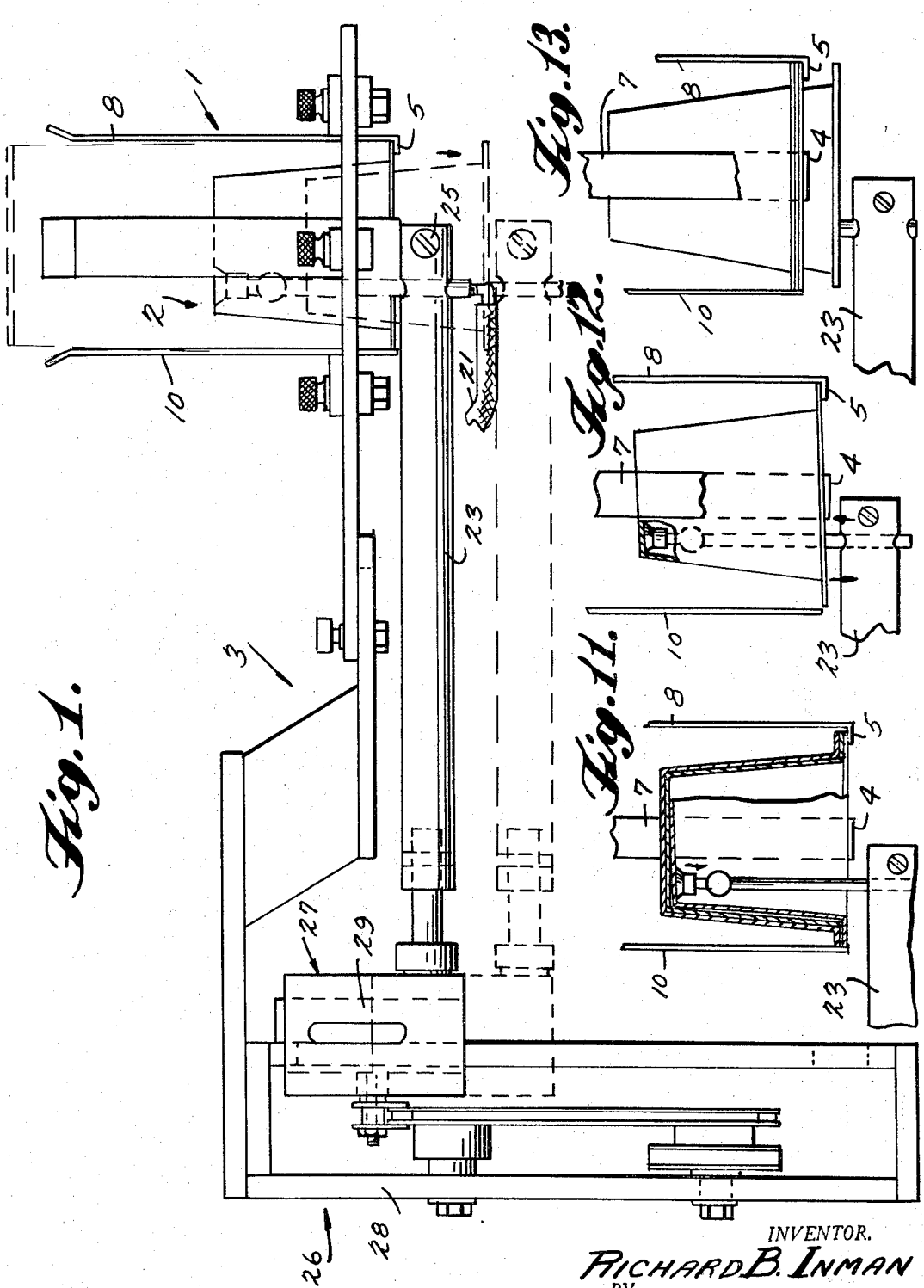

Oct. 3, 1967 R. B. INMAN 3,344,952
SUCTION APPARATUS AND METHOD FOR DE-NESTING
CONTAINERS FROM STACKS
Filed Feb. 21, 1966 4 Sheets-Sheet 2
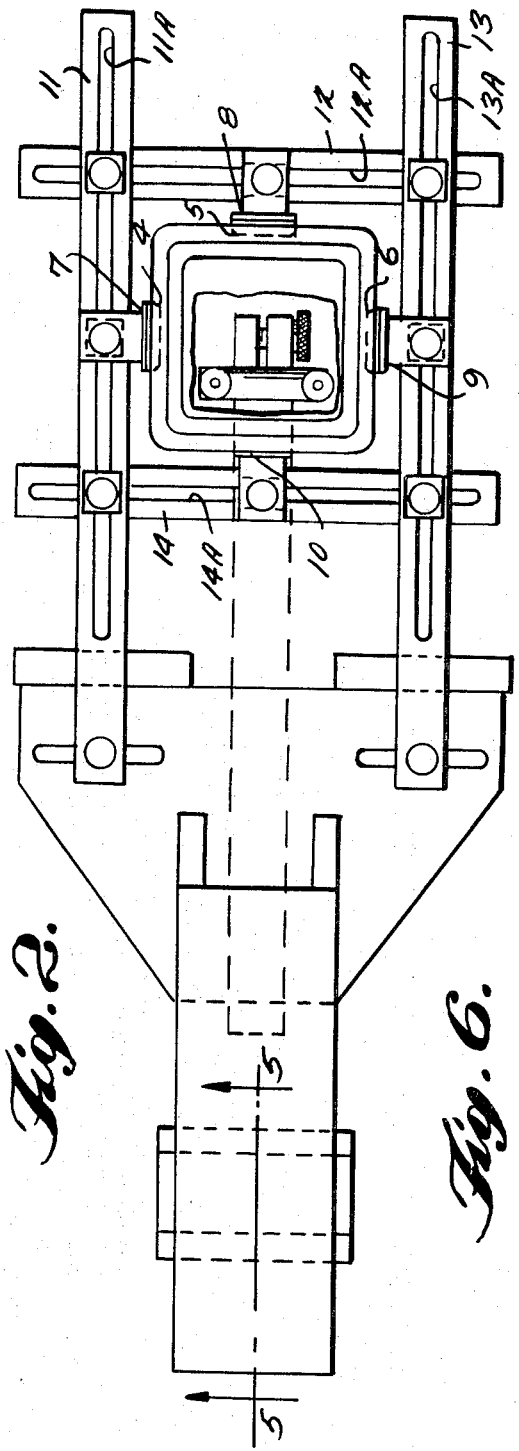
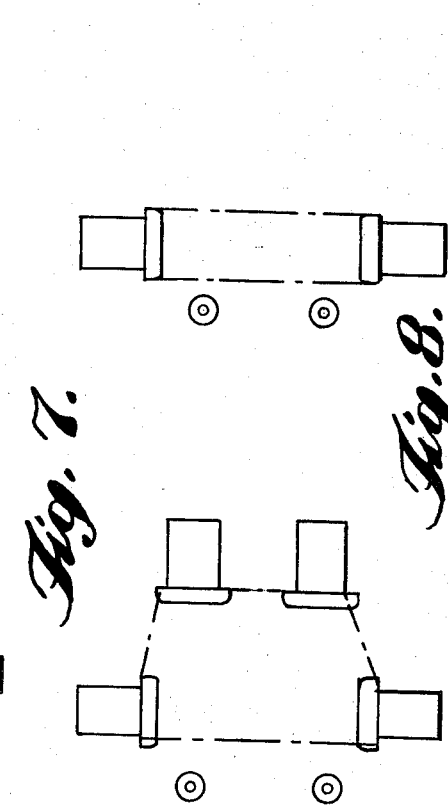
INVENTOR.
RICHARD B. INMAN
BY
Cushman, Darby & Cushman
ATTORNEYS Oct. 3, 1967 R. B. INMAN 3,344,952
SUCTION APPARATUS AND METHOD FOR DE-NESTING
CONTAINERS FROM STACKS
Filed Feb. 21, 1966 4 Sheets-Sheet 3

INVENTOR.
RICHARD B. INMAN
BY
Cushman, Darby, Cushman
ATTORNEYS

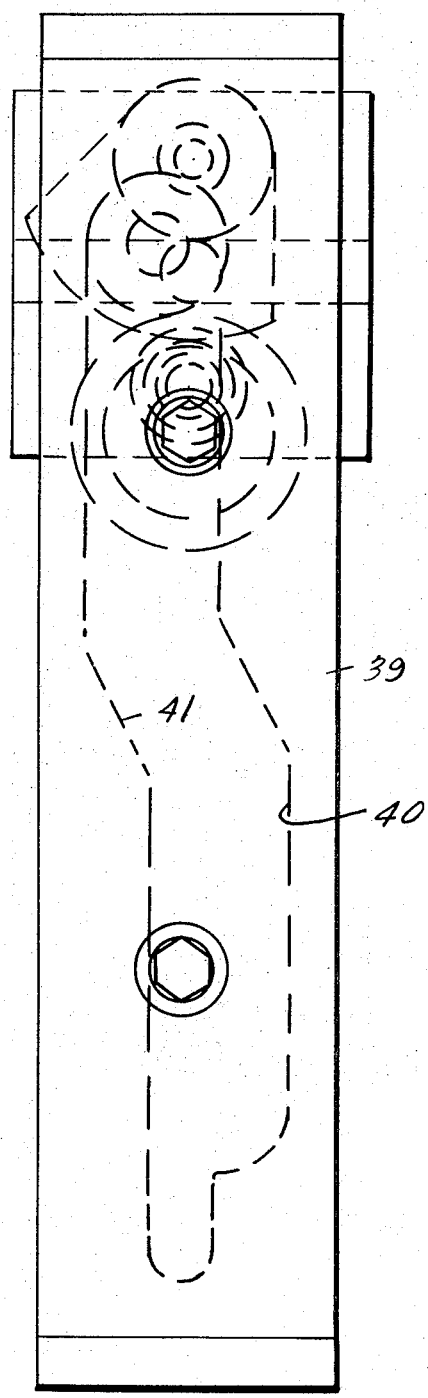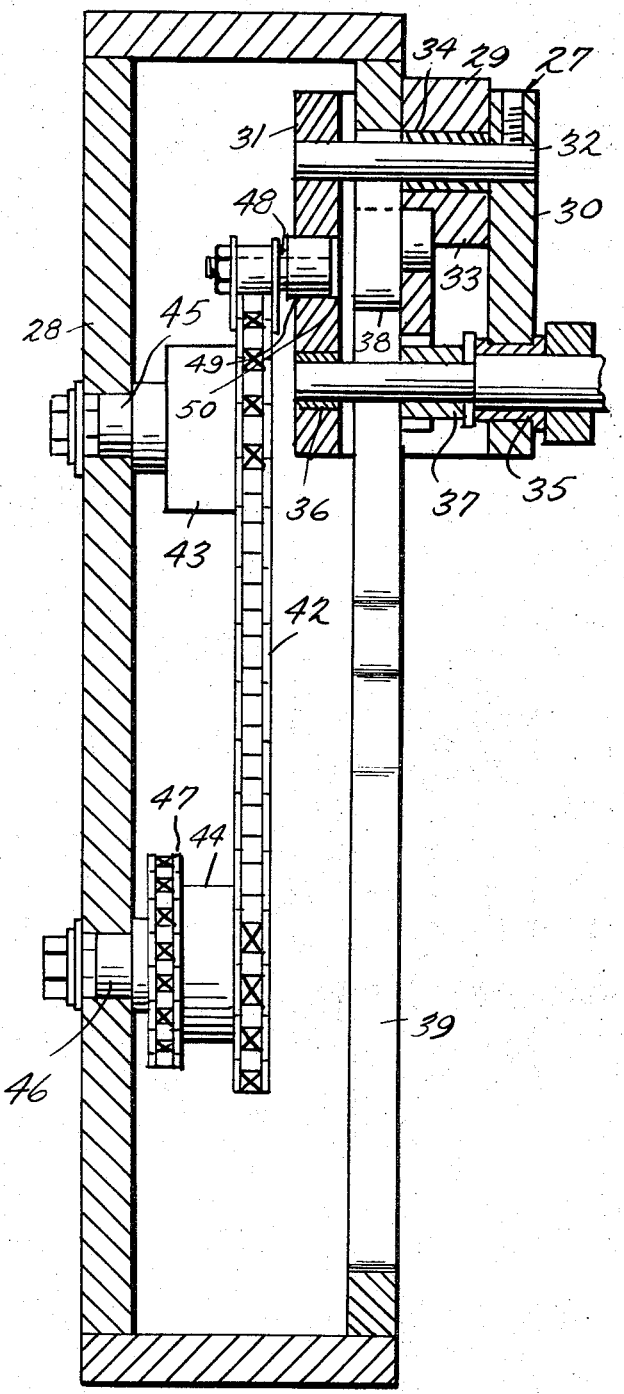

United States Patent Office 3,344,952
Patented Oct. 3, 1967

3,344,952
SUCTION APPARATUS AND METHOD FOR DE-NESTING CONTAINERS FROM STACKS
Richard B. Inman, Fulton County, Ga., assignor to Scientific-Atlanta, Inc., Atlanta, Ga., a corporation of Georgia
Filed Feb. 21, 1966, Ser. No. 529,133
9 Claims. (Cl. 221—41)

This invention relates to apparatus and a method for de-nesting containers and, more particularly, for withdrawing individual cups constructed of plastic material from a stack of cups. Briefly stated, the apparatus withdraws individual cups by a suction device, and, in a preferred embodiment, the suction device transports the cups to a pre-selected position. The suction device grips the inside of the bottom of each cup and pulls, collapsing the side wall of the cup slightly and releasing the air pocket between adjacent cups. Then the cup is tilted slightly and pulled from the stack.

Cups of the type with which the invention is particularly concerned are constructed of transparent plastic and have a bottom, sides and a sealing flange extending outwardly from the upper ends of the sides. Typically, the plastic is polyvinyl chloride, polystyrene or a similar material having a thickness of the order of about 5–20 mils. The exact thickness depends on the stiffness and strength of the plastic, and the design of the cup. The walls of the cup may have ribs which provide additional strength, and in such cases, the walls may be a little thinner. Cups of this type are in widespread use in packaging sliced luncheon meats, wieners, dairy products, salads and a large variety of other goods. Ordinarily, the cup bottom is smaller than the opening within the rim, the walls of the cup being inclined, so that each cup may be inserted into another. Therefore, it is common practice for a cup manufacturer to ship the cups in stacks of, e.g. 100 cups.

The cups usually have de-nesting or de-stacking means formed in sidewalls. Typically, this is a ring immediately below the flange which increases the cross-sectional area of that portion of the cup to limit the depth of insertion of each cup into another. This arrangement reduces the area of contact between cups and makes it easier to separate them. Nevertheless, a certain pulling force is required to extract individual cups from a stack. For example, the cups are often in such close contact that they form a closed air pocket. When they are pulled apart, a partial vacuum is created in the air pocket which must be overcome.

Frequently cups are separated manually, prior to filling. However, in large scale operations in which automatic filling equipment can be used, it is desirable to handle the cups mechanically. A number of de-nesting machines have been developed, for example those described in Robinson U.S. Patent 3,091,362 and Stenger U.S. Patent 2,653,743. However, these are not entirely satisfactory, especially for plastic cups of the type described above.

Therefore, a principal object of the present invention is to provide an improved apparatus and method for withdrawing individual cups, especially plastic cups, from a stack. Another object is to provide apparatus which withdraws individual cups from an inverted stack and places them in a pre-selected position.

These objects are accomplished by an apparatus and a method which are described briefly above. A more complete explanation of the principles of the invention is given below. However, these will be understood more easily after first considering the following description of apparatus constituting one specific embodiment of the invention, reference being made to the drawings. Some parts are omitted from various figures in the drawing, for clarity.

Figure 10:
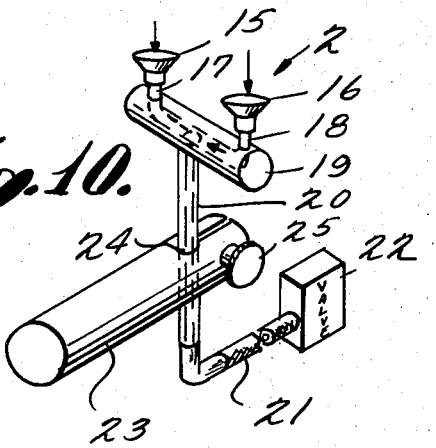
Figure 3:
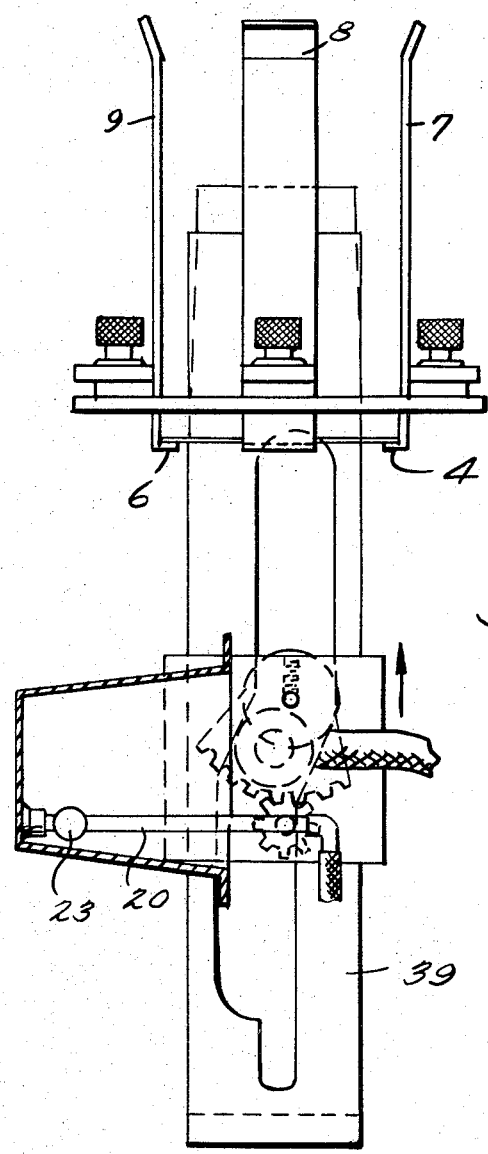

FIG. 1 is a front elevation of the apparatus;
FIG. 2 is a plan view of the apparatus;
FIG. 3 is a side elevation showing one end of the apparatus;
FIG. 4 is a side elevation of the other end of the apparatus showing a portion thereof;
FIG. 5 is a section of a part of the apparatus along lines 5—5 of FIG. 2;
FIGS. 6–9 are schematic plan views of various embodiments showing the manner in which cups are supported in stacks;
FIG. 10 is a perspective view of a portion of the apparatus; and
FIGS. 11–13 are elevations, partly in section, showing the steps of extracting cups from a stack.

The apparatus shown in the drawings can be characterized as having three components: a cup hopper holding a stack of inverted cups, a suction device which attaches to individual cups and a transport mechanism, indicated respectively by the numerals 1, 2 and 3. As will be explained in detail, the transport mechanism lifts the suction device against the inside of the bottom of a cup, lowers the suction device with a cup, inverts them, and lowers them until the cup is in a pre-selected position. Different transport mechanism may be used to move the cup to other pre-selected positions.

The cup hopper 1 may be of many designs, depending on the shape of the cups, but its important elements are a plurality of fingers beneath the edges of the cups. The exact arrangement of these fingers depends on the shape of the cups and other factors. However, for purposes of illustration, square cups are shown in FIGURES 1–6 supported by three fingers indicated by the numerals 4, 5 and 6. The fingers shown are turned-in extensions at the lower ends of uprights 7, 8 and 9 which are bands of sheet metal, such as aluminum, constituting three sides of the hopper. There is a fourth upright 10 of the same type which is the fourth side of the hopper, but not having a finger at its lower end. In the form shown in FIGURE 1, the uprights are mounted on an adjustable rack permitting adaptation to various sizes and shapes of cups. However, in actual practice, it may be desirable to use fixed support means for the sides of the hopper and provide for interchangeability of hoppers for various cups, since this will assure better alignment of the cups with respect to other parts of the apparatus.

In the form shown in FIGURES 1–6, the support means is constructed of four elongated horizontal plates, designated by the numerals 11, 12, 13 and 14, parallel to the respective sides of the cup, and arranged at right angles to each other to define a rectangular or square area. The plates have lengthwise slots 11A, 12A, 13A and 14A, and, at points of intersection, releasable fastening means are provided such as bolts passing through the respective slots and nuts. The respective uprights 7–10 have outwardly extending flanges fastened to the elongated plates 11–14 by similar means. The suction device 2 comprises one or more means capable of pressing against the bottom of a cup and forming a relatively tight seal, and means for applying and then releasing suction so as to successively form and then release a grip on a cup. In the embodiment illustrated (see FIG. 10), this comprises a pair of suction cups 15 and 16 mounted on the ends of vertical tubes 17 and 18 respectively. The other ends of the tubes are fitted to a hollow block 19 which is mounted on one end of a pipe 20. The other end of the pipe is connected to a flexible tube 21 which connects to a switching valve 22. The valve 22 has inlets (not shown) from vacuum and pressure sources and alternatively connects one and then the other of these inlets to the flexible tube 21 so as to supply suction and pressure to suction cups 15 and 16. The valve may be switched electrically, e.g., by a switch actuated by movement of parts in the transport mechanism 3.

The transport mechanism includes a shaft 23 having a drilled hole 24 near one end, through which the pipe 20 passes. The hole 24 is near one end of the shaft 23 and the shaft is split from the hole 24 to the end. A screw 25 is provided to tighten the split sections of the end of the shaft against pipe 20.

The remainder of the transport mechanism is an inverter, indicated generally by the numeral 26, which reciprocates the shaft 23 vertically and rotates it 180° at about the mid-point of the stroke so that, after each cup is extracted from the hopper, it is set down upright. The inverter comprises a carriage 27 mounted on a housing 28. The carriage comprises a hollow block 29 having parallel front and back members 30 and 31 respectively and open at top and bottom. A fixed horizontal shaft 32 is mounted through openings in front and back members 30 and 31, and a gear segment 33 is journaled on the fixed shaft, freely rotatable around a bearing 34.

The shaft 23 also passes through openings in the front and back members 30 and 31 below the shaft 32; however, it is freely rotatable because of bearings 35 and 36. A smaller diameter gear 37 is pinned to the shaft 23 in position to mesh with gear segment 33, so that rotation of the gear segment, e.g., about 60° causes a 180° rotation of shaft 23. Rotation of the gear segment 33 is accomplished by a roller 38 fastened to it and a guide bar 39. The guide bar has a vertical cam track 40 in which roller 38 moves as the block 29 moves up and down, and, as seen in FIGURE 4, the cam track has an offset or inclined segment 41 which causes a horizontal movement of roller 38 and therefore rotation of gear segment 33.

Vertical movement of the block 29 is provided by a chain 42 trained around sprocket wheels 43 and 44 which are rotatably mounted on shafts 45 and 46 bolted one above the other to the back of housing 28. The lower wheel 44 has two sets of sprockets, one driving the chain 42 and the other engaged by a chain 47 driven by another sprocket wheel (not shown) connected to a motor.

One link of the chain 42 carries a bolt 48 which is the mounting for a cam roller 49 which slides in horizontal ways 50 in the back member 31 of the block 29, but also moving the block vertically. Consequently, as the chain travels one complete loop, the block reciprocates once.

An important feature of the invention is the positioning of the suction device 2 with respect to the fingers 4, 5 and 6. To understand this, reference will be made to FIGURE 6 which may be considered to be a schematic plan view of the hopper. The three fingers support the cups at three positions, and if these are connected by lines, there is outlined an area 51 which will be referred to as the area of support. In the preferred form of the invention, the center of gravity of each of the cups is within this area, but this is not essential since the stack is partially restrained against tilting by the uprights. On the other hand, the suction device grips the lowermost cup outside the area of support. That is, the cup bottom may be considered to be divided into two areas, separated by a line of division, one being over the area of support and another not. The suction is applied to one side of the line of division and the area of support is on the other side. As a result, a couple is established which tends to cause a tilting of the cup. (A couple is defined as a pair of forces of equal magnitude and opposite direction but whose lines of action do not coincide, Sears, Principles of Physics, vol. I, 1944, page 45.) When the suction device is raised, a suction is applied to the suction cups and they grip the inside of the bottom of a cup. Then, as the suction cups are lowered (see FIG. 11), the first effect is a slight buckling of the cup. That is, as the cup bottom is pulled downwardly, the side of the cup is drawn slightly inwardly. This causes a small opening to form between the lower-most cup and the cup immediately above it, thereby "breaking" the vacuum and reducing the force required to withdraw the lower-most cup. The next event is a tilting of the cup because of the couple described above (see FIG. 12). (It will be appreciated that these are not necessarily discrete steps carried out in sequence. They ordinarily appear to take place simultaneously. However, for purposes of description, they are referred to as individual steps carried out in order.

As the cup tilts, it is lifted from the finger 5, and the area of contact with fingers 4 and 6 is reduced. Thus, the upward force against the cup flange is localized, or concentrated at two points, i.e., the edges of the fingers 4 and 6. This concentration of force causes a small area of the flange to bend and the cup descends.

The effect of tilting the cup before lowering it is to reduce the force required to bend its flange. This is important, because it is desirable to reduce the pull applied to the bottom of the cup. If the force applied is too great, the corners of the cup will buckle and frequently this will create a weakness which may ultimately fracture the plastic. It was originally thought that this problem could be dealt with by use of deformable fingers of spring steel and a centrally-positioned suction cup. However, these did not adequately support the stack, and when the suction device was lowered, the entire stack was pulled down. The same effect would be expected if the flexibility of the cup flanges were increased, and furthermore, relatively rigid flanges are advantageous in re-enforcing the package and easier to produce when the cups are vacuum formed from plastic sheet.

The number of fingers is not limited to three. For example, it is possible to use only two if they are moderately wide, as shown in FIGURE 8, and capable of supporting the cups. It also is possible to use 4 fingers as shown in FIG. 7, or more. Preferably, the two fingers closest to the point at which suction is applied are about equally distant from the center of the cup, for better equalization of stresses.

In another embodiment of the invention useful for some cups, it is possible to use, say, four fingers spaced equally around the cup, and, in such cases, the suction device may initially be within the area of support. This is illustrated in FIG. 9 wherein the initial area of support is indicated by the number 151. The suction device is positioned near one of the fingers so as to initially apply most of the stress on that area of the flange. This will cause the flange to pull past this finger only, reducing the area of support to that designated by the numeral 251, and then the cup is withdrawn as described above. However, this arrangement operates more efficiently than when the suction device acts on the center of gravity since forces are still not applied equally on all of the fingers simultaneously.

This embodiment is particularly useful for rather shallow cups having somewhat thinner plastic in the flange and walls than larger cups. Cups of this type frequently are manufactured by vacuum-forming or otherwise thermo-forming plastic sheet. In vacuum forming, the flange area normally remains about the thickness of the original sheet while the walls tand bottom of the cup are drawn thinner. Therefore, relatively shallow cups ordinarily will be made from thinner stock while larger cups are made from heavier stock and have thicker flanges. In addition, shallow cups do not require as thick walls to retain the desired degree of rigidity. Therefore, these cups are not as susceptible to buckling, and can be operated more successfully with the last mentioned embodiment.

The number of suction cups also is subject to change. The use of two suction cups has been found better, at least for some types of plastic cups, since it provides better distribution of stresses, thereby reducing the tendency of the cups to buckle. However, the apparatus has been operated with a single suction cup, and it is possible to use, e.g. three or four suction cups.

In some cases, it has been found desirable to apply a slight pressure to the tops of the cups, to assure that the last few cups are extracted from the hopper. That is, a suction cup is made of rubber or other elastomeric material capable of sufficient flexing to form an air-tight seal against the plastic container. However, the suction cup must initially be pressed relatively firmly against the plastic until a seal is formed and the air between them is evacuated. When there is a high stack of cups, the suction cup presses against the weight of the stack and there is sufficient pressure for the seal to form. After most of the cups are removed, the suction cup merely lifts the last few cups without forming the seal.

It is rather easy to determine the amount of weight required. If added weight is needed, when a stack is loaded and de-nested, there will be a few cups left which cannot be removed; the number left for any particular type of plastic cup will remain about the same for successive stacks. The weight to be added will be only a little more than the total weight of the cups left in the hopper. The weight also depends on the nature of the suction cups; for example relatively stiff suction cups may require a little more weight on the stack than those which are relatively flexible.

As indicated above, the transport mechanism may be changed to move extracted cups to various positions. It can precision position the cup in a moving conveyor, or otherwise, either directly below the conveyor or elsewhere. By suitable modification of the transport mechanism, the stack of cups in the hopper may be placed in an upright position, spring means being used to lift the cups against the fingers.

Other changes may be made in details of construction and mode of operation without departing from the invention. Therefore, it is not intended to limit the scope of invention to the embodiments described, but only as defined in the appended claims.

I claim:

1. Apparatus for de-nesting a stack of cups comprising a plurality of fingers providing support for the lowermost cup in said stack at spaced points around its perimeter, so that an area of support is defined within said lowermost cup by straight lines connecting each of said fingers with the next of said fingers around said perimeter, a suction device capable of pressing against said lowermost cup and forming a vacuum between itself and said lowermost cup, and transport means operatively connected to said suction device to move said suction device past said fingers and against a portion of said cup outside said area of support and then to withdraw said cup, whereby a couple is formed by the forces of said suction device and said fingers to tilt said cup and the cup is then pulled past said fingers.

2. Apparatus for de-nesting a stack of cups as set forth in claim 1 including a hopper at least partially surrounding said stack of cups and limiting tilting thereof.

3. Apparatus for de-nesting a stack of cups as set forth in claim 1 in which said suction device comprises a plurality of suction cups and means for creating a vacuum between said suction cups and a cup in said stack.

4. Apparatus for de-nesting a stack of cups as set forth in claim 3 in which there are two suction cups.

5. Apparatus for de-nesting a stack of cups as set forth in claim 1 in which said fingers are in a horizontal plane so that cups may rest on them, and said transport means raises said suction device against a cup and then lowers it past said fingers in a substantially vertical path.

6. Apparatus for de-nesting a stack of cups as set forth in claim 5 in which said transport mechanism is constructed and arranged to invert said cup after it is withdrawn from said stack but before it is released from said suction device.

7. Apparatus for de-nesting a stack of cups as set forth in claim 1 including means for releasing said vacuum to separate said cup from said suction device.

8. Apparatus for de-nesting a stack of cups comprising means for supporting the lowermost cup in a stack at points about its perimeter so that an area of support is defined within said lowermost cup by straight lines connecting each of said points with the next of said points around said perimeter,
means for engaging a cup,
and transport means operatively connected to said engaging means to move said engaging means past said suporting means and against a portion of said cup outside of said area of support and then to withdraw said cup,
whereby a couple is formed by the forces applied to said transport means and by said supporting means to tilt said cup and the cup is separated from said stack and pulled past said supporting means.

9. A method for removing individual plastic cups from a stack thereof comprising the steps of supporting the end of said stack on stationary support members at a plurality of points about its perimeter applying a pulling force to the inside of the bottom of said end cup, to pull it toward the rim of said end cup, said force being applied near one side of said bottom and adjacent one of said support members so that said end cup is buckled to release inter-cup vacuum and move the cup past said one support means, continuing to apply said force to produce a couple with the counter forces applied by the others of said supporting means so that said cup is tilted and the cup is separated from said stack.

References Cited

UNITED STATES PATENTS 1,698,239    1/1929    Morin _____ 221—41
3,258,155    6/1966    Peppler _____ 221—211

SAMUEL F. COLEMAN, *Primary Examiner.*